United States Patent
Bobenhausen

(10) Patent No.: US 7,331,401 B2
(45) Date of Patent: Feb. 19, 2008

(54) METHOD AND APPARATUS FOR FIGHTING A FIRE IN AN ENCLOSED SPACE IN AN AIRCRAFT

(75) Inventor: Axel Bobenhausen, Bremen (DE)

(73) Assignee: Airbus Deutschland GmbH, Hamburg (DE)

(*) Notice: Subject to any disclaimer, the term of this patent is extended or adjusted under 35 U.S.C. 154(b) by 407 days.

(21) Appl. No.: 10/831,445

(22) Filed: Apr. 22, 2004

(65) Prior Publication Data

US 2004/0216900 A1    Nov. 4, 2004

(30) Foreign Application Priority Data

Apr. 26, 2003 (DE) ................. 103 18 974

(51) Int. Cl.
*A24F 25/00* (2006.01)
(52) U.S. Cl. .............. 169/46; 169/45; 169/70; 169/62; 169/51; 244/129.2
(58) Field of Classification Search ............. 169/46, 169/64, 45, 53, 70, 62; 244/129.2, 118.5; 454/76; 52/317, 232
See application file for complete search history.

(56) References Cited

U.S. PATENT DOCUMENTS

| | | | | |
|---|---|---|---|---|
| 3,583,658 A | * | 6/1971 | Herweg | 244/118.5 |
| 5,501,284 A | * | 3/1996 | Clodfelter et al. | 169/54 |
| 5,924,589 A | | 7/1999 | Gordon | |
| 6,572,948 B1 | | 6/2003 | Dykhoff | |
| 6,752,714 B1 | * | 6/2004 | Mann | 454/369 |
| 7,093,666 B2 | * | 8/2006 | Trumper | 169/62 |
| 2001/0046456 A1 | | 11/2001 | Langer et al. | |
| 2004/0157012 A1 | | 8/2004 | Miller at al. | |
| 2004/0211150 A1 | | 10/2004 | Bobenhausen | |
| 2004/0213320 A1 | | 10/2004 | Bobenhausen | |

FOREIGN PATENT DOCUMENTS

| | | | |
|---|---|---|---|
| DE | 3612377 | | 10/1987 |
| DE | 297 12 909 | | 11/1997 |
| EP | 1 283 065 | | 2/2003 |
| GB | 2107183 | * | 8/1982 |
| GB | 2107182 | | 4/1983 |
| GB | 2159051 | * | 11/1985 |
| GB | 2277871 | | 11/1994 |
| GB | 2 312 842 | | 11/1997 |
| GB | 2 376 706 | | 12/2002 |

* cited by examiner

Primary Examiner—Dinh Q Nguyen
(74) Attorney, Agent, or Firm—W. F. Fasse; W. G. Fasse

(57) ABSTRACT

Fire that has started in an enclosed space in an aircraft is smothered by closing or at least partly closing any air flow inlet and any air flow outlet of the enclosed space in response to a temperature rise caused by a fire in the enclosed space such as a toilet or crew quarters, galley cabinets, or the like. For this purpose fireproof, intumescent material is installed next to and along any apertures or openings in the enclosed space. When the temperature in the enclosed space exceeds the expansion temperature of the fireproof intumescent material the material expands into these apertures, thereby sealing or at least partly sealing these apertures, whereby air and thus oxygen access to the fire is reduced or even prevented, thereby smothering the fire. Preferably a guide surface guides the expanding intumescent material into the apertures or openings at least when the expansion starts.

20 Claims, 1 Drawing Sheet

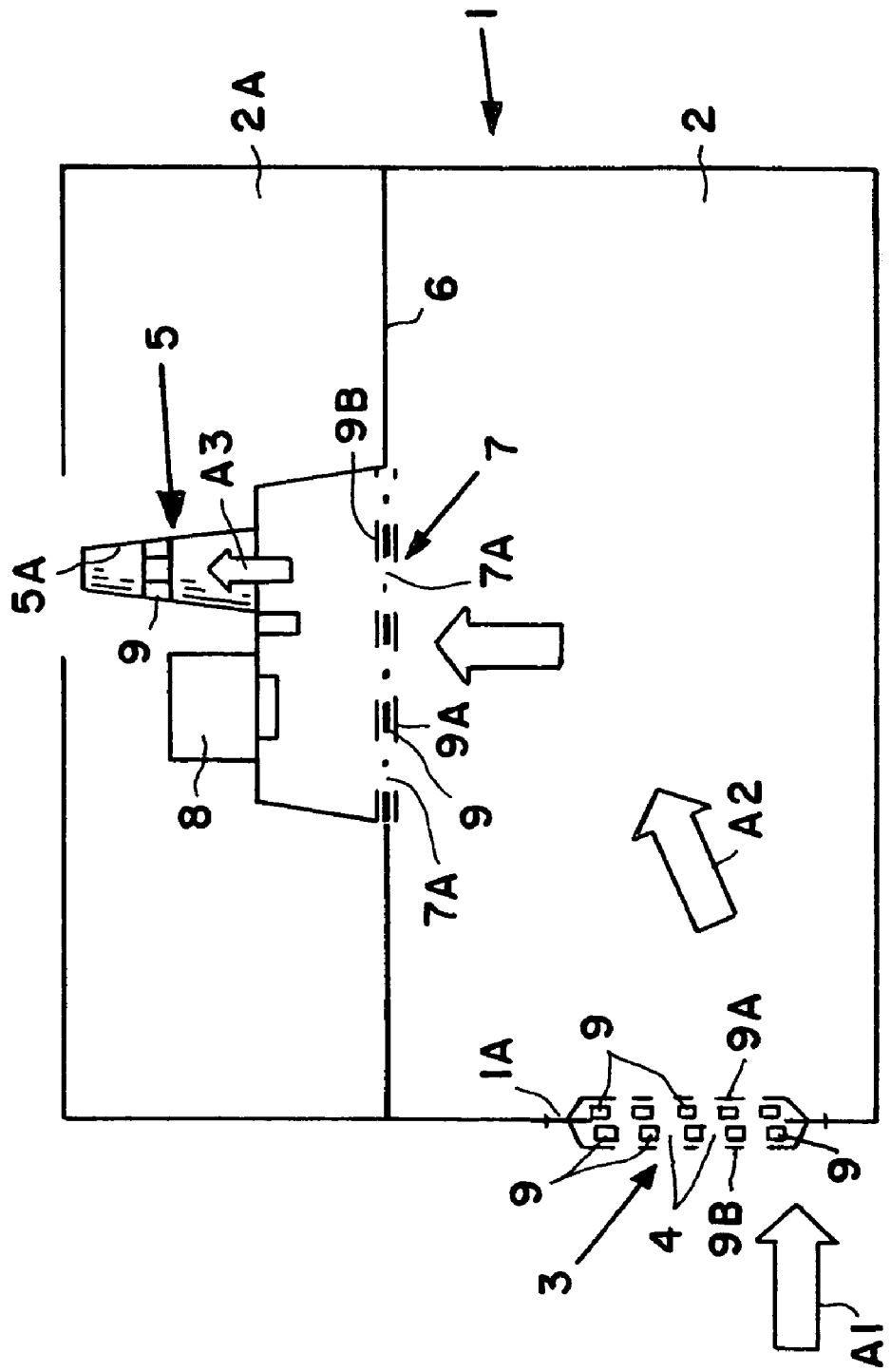

METHOD AND APPARATUS FOR FIGHTING A FIRE IN AN ENCLOSED SPACE IN AN AIRCRAFT

CROSS-REFERENCE TO RELATED APPLICATION

This application is related to my copending application Ser. No. 10/831,444 entitled "Method And Apparatus For Detecting Smoke and Smothering a Fire", filed on Apr. 22, 2004. The entire disclosure of the related application is incorporated herein by reference.

PRIORITY CLAIM

This application is based on and claims the priority under 35 U.S.C. §119 of German Patent Application 103 18 974.2, filed on Apr. 26, 2003, the entire disclosure of which is incorporated herein by reference.

FIELD OF THE INVENTION

The invention relates to fighting a fire, for example in a toilet of an aircraft.

BACKGROUND INFORMATION

In special areas of an aircraft such as an enclosed aircraft toilet or crew quarters, air is sucked out of the enclosed space, particularly during flight and replaced by fresh air or at least treated air. The air exchange in the toilet can take place as a result of the pressure differential between the air pressure inside the aircraft and the atmospheric pressure outside the aircraft. The ventilation of the aircraft may also be accomplished by a ventilation device such as a fan. If a fire should have started in an aircraft toilet, it is currently not possible to stop sucking out air of the enclosed toilet space nor is it possible to stop the ventilation by individually switching off the fan which is usually installed in the ceiling of the aircraft toilet. As a result, a fire in an aircraft toilet keeps receiving air and thus oxygen, thereby fueling the fire which is to be avoided.

UK Patent Publication GB 2,107,182 A discloses various types of louvers for covering openings in buildings and in doors of buildings for air ventilation. These louvers are constructed with slats, the back side of which is coated with intumescent material for closing off the air flow channels formed between neighboring slats of the louver when the intumescent material is exposed to elevated temperatures sufficient to cause the intumescent material to expand. Since the expansion is uncontrolled, particularly with regard to the direction of expansion it is not always assured that the cross-sectional flow areas between two neighboring slats are completely sealed off. Thus, some air could still pass through the louvers.

German Patent Publication DE 36 12 377 A1 discloses a fire protection sealing tape in which a tape material is combined with one or more intumescent fire protection strands. The intumescent strands which expand their volume in response to a respective expansion temperature, are combined with the tape material in such a way, that the expansion of the intumescent material will expand the adhesive tape. These tapes have at least one adhesive outer surface. One or more intumescent material strands may be completely embedded in the tape material. Another conventional adhesive tape has a strand or strip of intumescent material positioned between two strips of tape material. The adhesive tape combined with an intumescent material strand or strands is installed in joints between neighboring sections of steel reinforced ceilings, walls, slots between lightweight construction walls, concrete ceilings and generally in gaps that must be closed. The main purpose of these conventional adhesive tapes is to prevent a fire that has started in one room from moving into neighboring rooms.

UK Patent Publication GB 2,277,871 A discloses a fire-resistant container in which a metal casing and its metal door are lined on the inside with layers of an intumescent adhesive, a heat resistant thermal insulating material, and an intumescent strip. The fire-resistant container is for example used to protect filing cabinets against a fire.

Thus, there is room for improvement with regard to smothering a fire that has started in an aircraft toilet or other enclosed space within the aircraft body.

OBJECTS OF THE INVENTION

In view of the foregoing it is the aim of the invention to achieve the following objects singly or in combination:

to provide a method and apparatus for avoiding the fueling of a fire that has started in an enclosed space such as a toilet in an aircraft;

to interrupt or at least substantially interrupt the supply of air and thus of oxygen into the enclosed space such as an aircraft toilet to thereby smother a fire that has started in the enclosed space; and to guide the expansion of a fireproof intumescent material into air flow openings of an air flow inlet and into an opening or openings forming an air flow outlet.

SUMMARY OF THE INVENTION

The above objects have been achieved according to the invention in that next to an air inflow opening or openings and next to an air outflow opening or openings of an enclosure in an aircraft, intumescent fireproof material is installed that increases its volume in response to heat, whereby the air inflow opening or openings and the air outflow opening or openings are simultaneously closed or substantially closed so that the supply of air and/or oxygen into an aircraft enclosure, such as an aircraft toilet, is reduced or even completely prevented, simultaneously with preventing any flow through the outflow opening or openings, whereby the fire is smothered. The term "substantial" as used in this context defines the extent to which air access into the enclosed space has been reduced or prevented. If the fire is smothered by the reduction of air access, the reduction was substantial.

It is an advantage of the present method and the present apparatus that a fire that started in an enclosed space such as an aircraft toilet or a crew resting area or in a galley cabinet can be successfully suffocated by a passive means, namely the fireproof intumescent material that simultaneously closes all openings into and out of the enclosure by its expansion in response to heat. Another advantage of the invention is seen in the relatively small costs compared to so-called active firefighting systems, for example the closing of air flow valves in response to the occurrence of a fire.

BRIEF DESCRIPTION OF THE DRAWINGS

In order that the invention may be clearly understood, it will now be described in connection with example embodiments thereof, with reference to the accompanying single FIGURE which shows schematically an enclosed space in an aircraft.

DETAILED DESCRIPTION OF AN EXAMPLE EMBODIMENT AND OF THE BEST MODE OF THE INVENTION

The single FIGURE shows an enclosure 1 such as an aircraft toilet, a crew quarter, a galley cabinet, or the like. A door 1A leads into the interior 2 of the enclosure 1. An air flow inlet, preferably in the form of a grid structure 3 is installed in the door 1A, whereby air can normally flow into the interior 2 as indicated by the arrows A1 and A2. The grid structure 3 is provided with apertures or openings 4 through which the air can flow when these openings or apertures are not obstructed. The interior 2 has a ceiling 6 in which an air flow outlet 7 is installed, preferably also in the form of a grid structure providing a plurality of openings or apertures 7A. An air outflow channel 5 is installed in a space 2A above the ceiling 6. The air outflow channel 5 has a wall 5A that forms, for example, a conical shape with a cross-sectional flow area that diminishes outwardly relative to the air flow direction indicated by the arrow A3. A smoke detector 8 is installed in the space 2A in a position for monitoring any smoke generation in the interior 2 and in the space 2A.

According to the invention, fireproof intumescent material 9 is installed alongside and/or parallel to any openings or apertures 4, 7A in the grid structures 3 and alongside and/or parallel to the openings or apertures 7A of the air flow outlet 7. Preferably intumescent material in the form of an adhesive tape is used for this purpose. Fireproof intumescent material is produced for example by the German Firm BASF AG as "PALUSOL" (TM).

Preferably, the fireproof or fire resistant intumescent material 9 is installed on both sides of the openings or apertures 4 in the air flow inlet 3. Further, the intumescent material 9 is preferably covered with a thin flat material 9A that forms a guide surface which will facilitate the expansion of the intumescent material into the openings 4. Preferably, when the intumescent material 9 is installed on both sides of the openings 4, an additional guide surface 9B is provided on the outside. In the shown embodiment the intumescent material 9 on both sides of the openings 4 is enclosed by perforated guide surfaces 9A and 9B. However, the use is not necessary, merely preferred for at least initially guiding the intumescent material into the openings 4.

The air flow outlet 7 preferably forms a grid structure in which the intumescent material 9 is also preferably enclosed between perforated guide surfaces 9A and 9B. Preferably, the guide surfaces 9A and 9B, or rather the spaces between these guide surfaces are so dimensioned that the surface area of the intumescent material 9 is somewhat smaller than that of the guide surfaces 9A, 9B whereby a guide gap is formed between the guide surfaces 9A, 9B. This guide gap faces the openings to be filed. Thus, when the intumescent material 9 begins its expansion, the direction of expansion is determined by the guide gap between the guide surfaces so that the intumescent material expands into the openings or apertures 7A which face the guide gap.

The intumescent material 9 installed inside of the air outflow channel 5 is preferably applied as a ring formed as an adhesive ring tape of fireproof or fire resistant intumescent material 9. Due to the inward sloping of the channel wall 5A, a guide component is imposed at least on the initially expanding intumescent material 9 so that the initial expansion is primarily in the direction opposite to the arrow A3, whereby a substantially complete sealing of the air flow channel 5 is facilitated when the intumescent material expands in response to heat generated inside the spaces 2, 2A.

The expansion of the intumescent material 9 into the openings or apertures 4, 7A and in the cross-sectional flow area of the channel 5 prevents or at least substantially reduces the access of air to the fire, thereby smothering the fire.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of fighting a fire in an enclosed space in an aircraft having at least one air flow inlet into said enclosed space and at least one air flow outlet out of said enclosed space, wherein said air flow outlet is an air outflow channel having an outwardly diminishing cross-sectional flow area, said method comprising the following steps:
   a) installing fireproof intumescent material next to said at least one air flow inlet,
   b) installing further fireproof intumescent material as a ring inside said air outflow channel,
   c) heating said fireproof intumescent materials by heat generated by a fire occurring in said enclosed space, and
   d) expanding said fireproof intumescent materials in response to said heating, whereby said diminishing cross-sectional flow area of said air outflow channel deflects expanding fireproof intumescent material at an angle inwardly, to at least partly seal said air flow inlet and said air outflow channel to substantially reduce air and oxygen access to said fire to smother said fire and to hinder propagation of said fire out of said enclosed space.

2. The method of claim 1, wherein said air flow inlet and outlet each has a plurality of inlet and outlet openings, said method comprising installing said fireproof intumescent material alongside and in parallel to said plurality of inlet and outlet openings.

3. The method of claim 2, comprising installing said fireproof intumescent material next to said plurality of inlet and outlet openings and on both sides of said inlet and outlet openings.

4. The method of claim 1, wherein said enclosed space in said aircraft comprises a ceiling and an air flow grid structure forming perforations in said ceiling upstream of said air flow outlet, said method further comprising installing an additional fireproof intumescent material next to said perforations for substantially closing said perforations when said additional fireproof intumescent material expands.

5. The method of claim 4, further comprising guiding expanding fireproof intumescent material into said perforations for at least partly sealing said grid structure.

6. The method of claim 4, further comprising using an adhesive tape of fireproof intumescent material for said installing of said additional fireproof intumescent material.

7. The method of claim 2, further comprising using an adhesive tape of fireproof intumescent material for said installing of said fireproof intumescent material along said openings.

8. The method of claim 1, further comprising guiding expanding fireproof intumescent materials into said at least one air flow inlet and into said at least one air flow outlet.

9. An enclosed space in an aircraft comprising walls, a ceiling, a door and a floor forming an enclosure, an air flow inlet, an air flow outlet, an air outflow channel positioned downstream of said air flow outlet, fireproof intumescent material installed next to said air flow inlet and next to said air flow outlet, and further fireproof intumescent material installed inside said air outflow channel for substantially sealing said air flow inlet and said air flow outlet when said intumescent materials expand in response to a fire inside said enclosed space in said aircraft for substantially reducing air inflow into said enclosed space and air outflow out of said enclosed space to suffocate a fire and to hinder spreading of said fire, wherein said air outflow channel has a wall enclosing a cross-sectional flow area that diminishes in an air outflow direction, whereby said wall forming said cross-sectional flow area deflects expanding fireproof intumescent material at an angle inwardly to substantially seal said air outflow channel.

10. The enclosed space of claim 9, wherein said further fireproof intumescent material is a ring installed inside said air outflow channel.

11. The enclosed space of claim 10, wherein said ring is an adhesive tape of fireproof intumescent material.

12. The enclosed space of claim 9, wherein said fireproof intumescent material is an adhesive tape.

13. The enclosed space of claim 9, wherein said air flow inlet and said air flow outlet each has a plurality of air flow apertures and wherein said fireproof intumescent material is positioned at least on one side of said air flow apertures for expansion into said apertures in response to heating said fireproof intumescent material by a fire.

14. The enclosed space of claim 13, wherein said fireproof intumescent material is positioned on both sides and next to said apertures.

15. The enclosed space of claim 9, further comprising at least one guide surface positioned for guiding expanding fireproof intumescent material into apertures formed in said air flow inlet and in said air flow outlet.

16. The enclosed space of claim 9, further comprising two guide surfaces (9A, 9B), said fireproof intumescent material (9) being positioned between said two guide surfaces forming a guide gap facing toward openings in said air flow inlet and toward openings in said air flow outlet for simultaneously guiding said fireproof intumescent material (9) into said openings formed in said air flow inlet and in said air flow outlet.

17. An aircraft toilet comprising walls, a door in one of said walls, a floor and a ceiling forming a toilet enclosure, an air inlet (4) into said toilet enclosure, an air outlet (7) out of said toilet enclosure, fireproof intumescent material installed in positions for expanding simultaneously into said air inlet and into said air outlet for simultaneously closing said air inlet and said air outlet in response to heat generated by a fire in said toilet enclosure, said simultaneous closing of said air inlet and said air outlet simultaneously preventing an air inflow into said toilet enclosure and an air flow out of said toilet enclosure to suffocate a fire in said aircraft toilet and to hinder spreading of said fire, further comprising an air outlet channel (5) positioned downstream of said air outlet (7) as viewed in an air flow direction (A3), further intumescent material installed for expanding inside said air outlet channel (5), and a further guide surface positioned and sloping for guiding an expansion said further intumescent material in a direction opposite said air flow direction (A3).

18. The aircraft toilet of claim 17, wherein said air inlet and said air outlet each comprises a plurality of air openings (4, 7A) and guide surfaces (9A, 9B) positioned relative to said air openings (4, 7A) and relative to said intumescent material (9) for guiding an expansion of said intumescent material into said plurality of air openings (4, 7A).

19. The aircraft toilet of claim 17, wherein said air inlet is installed in said door, wherein said air outlet is installed in said ceiling, wherein said air outlet channel is installed in an enclosure above said ceiling, and wherein said further guide surface is formed by said air outlet channel having a wall enclosing a cross-sectional flow area diminishing in an air outflow direction for guiding an intumescent material expansion in said direction opposite to said air flow direction (A3).

20. The aircraft toilet of claim 18, wherein said intumescent material (9) is constructed as an adhesive tape, wherein said guide surfaces (9A, 9B) are positioned on opposite sides of said adhesive tape, said adhesive tape of intumescent material having a surface area smaller than a surface area of said guide surfaces (9A, 9B) to form a guide gap facing toward said plurality of air openings (4, 7A).

* * * * *

UNITED STATES PATENT AND TRADEMARK OFFICE
CERTIFICATE OF CORRECTION

| | |
|---|---|
| PATENT NO. | : 7,331,401 B2 |
| APPLICATION NO. | : 10/831445 |
| DATED | : February 19, 2008 |
| INVENTOR(S) | : Bobenhausen et al. |

Page 1 of 1

It is certified that error appears in the above-identified patent and that said Letters Patent is hereby corrected as shown below:

On the cover page,

[*] Notice:   Subject to any disclaimer, the term of this patent is extended or adjusted under 35 USC 154(b) by 407 days Delete the phrase "by 407 days" and insert -- by 406 days --

Signed and Sealed this

First Day of July, 2008

JON W. DUDAS
*Director of the United States Patent and Trademark Office*